United States Patent [19]

Meyer et al.

[11] 4,341,301
[45] Jul. 27, 1982

[54] ADHESIVE SECURING OF ANCHORS IN BOREHOLE

[75] Inventors: Frank Meyer, Essen; Ingo Romey, Hünxe, both of Fed. Rep. of Germany

[73] Assignee: Bergwerksverband GmbH, Essen, Fed. Rep. of Germany

[21] Appl. No.: 49,045

[22] Filed: Jun. 15, 1979

Related U.S. Application Data

[63] Continuation of Ser. No. 887,319, Mar. 16, 1978, abandoned, which is a continuation of Ser. No. 758,542, Jan. 11, 1977, abandoned.

[30] Foreign Application Priority Data

Sep. 17, 1976 [DE] Fed. Rep. of Germany ....... 2641776

[51] Int. Cl.³ .............................................. B65D 25/08
[52] U.S. Cl. .................................. 206/219; 405/261; 215/DIG. 8
[58] Field of Search ........................ 206/219; 405/261; 215/DIG. 8

[56] References Cited

U.S. PATENT DOCUMENTS

| 2,609,880 | 9/1952 | Dyer | 206/806 |
|---|---|---|---|
| 3,100,045 | 8/1963 | Via, Jr. | 206/219 |
| 3,324,663 | 6/1967 | McLean | 206/219 |
| 3,731,791 | 5/1973 | Fourcade et al. | 206/219 |
| 3,731,853 | 5/1973 | Baumann et al. | 206/219 |
| 3,756,388 | 9/1973 | Murphy | 206/530 |
| 3,861,522 | 1/1975 | Llewellyn et al. | 229/56 |
| 3,913,733 | 10/1975 | Flesch et al. | 61/45 B |
| 3,996,722 | 12/1976 | Bernhardt | 206/219 |
| 4,009,778 | 3/1977 | Howell | 206/219 |

FOREIGN PATENT DOCUMENTS

| 807520 | 3/1969 | Canada | 206/219 |
|---|---|---|---|
| 1297554 | 11/1972 | United Kingdom | 206/219 |

Primary Examiner—Joseph Man-Fu Moy
Attorney, Agent, or Firm—Michael J. Striker

[57] ABSTRACT

A method of and an adhesive cartridge for securing an anchor or the like in a bore hole or the like. The cartridge comprises an outer tube and an inner tube within this outer tube. Between the inner and outer tube is a mass of synthetic-resin material and filler. The inner tube is filled with a hardener capable of reacting with the synthetic-resin to form a mass capable of holding the rock anchor or the like in the borehole. At least the outer tube is made of an elastomeric polymer with which is mixed a filler that renders the outer tube completely opaque. The inner tube may also be extruded simultaneously with the outer tube of the same synthetic-resin material. It is also possible otherwise to partition the interiors of the outer tube, or to provide the one component in the outer tube directly in contact with the other component but unmixed therewith.

15 Claims, 8 Drawing Figures

U.S. Patent    Jul. 27, 1982    4,341,301
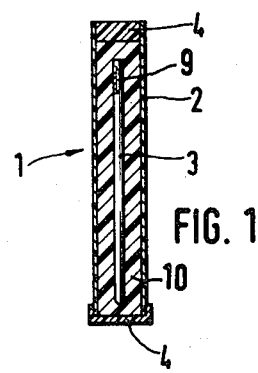
FIG. 1
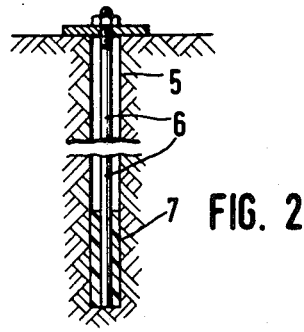
FIG. 2
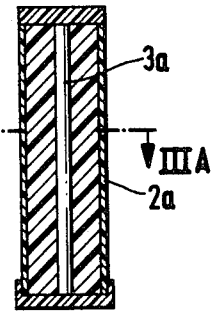
FIG. 3
FIG. 3A
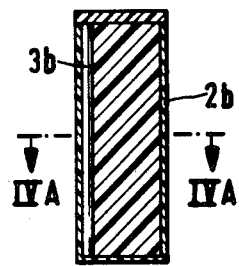
FIG. 4
FIG. 4A
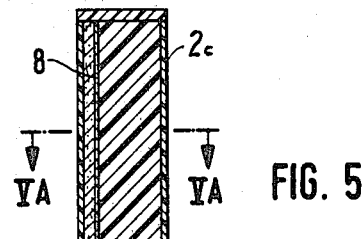
FIG. 5
FIG. 5A

ADHESIVE SECURING OF ANCHORS IN BOREHOLE

CROSS-REFERENCE TO RELATED APPLICATIONS

This is a continuation of application Ser. No. 887,319, filed Mar. 16, 1978 and now abandoned, which in turn is a continuation of application Ser. No. 758,542, filed Jan. 11, 1977 and now abandoned.

BACKGROUND OF THE INVENTION

The present invention relates to the adhesive securing of an object in a hole. More particularly this invention concerns a cartridge which contains both components of a two-component adhesive used to secure the end of an extensometer, rock bolt or the like in a mine borehole.

It is known to secure a borehole anchor such as described in the commonly assigned patent application Ser. No. 666,633 filed Mar. 15, 1976 or an extensometer such as described in the commonly assigned and copending patent application Ser. No. 582,417 filed May 29, 1975 in a mine borehole by means of an adhesive cartridge. The cartridge is placed at the blind end of the hole and the object being anchored in the hole is then inserted into the hole so as to break this cartridge and mix together the two components, usually hardener and resin of an epoxy-type adhesive, so that they react and form an extremely strong bond between the object being secured and the borehole. To this end the inner end of the object being secured is normally provided with a pointed mixing tip that serves to break the cartridge and which, on rotation, serves to mix together the two components of the adhesive.

In the commonest such cartridge there is provided an outer glass envelope which contains the resin and a filler. Also received within this outer glass envelope is a smaller inner glass envelope in which the hardener is contained. Thus the hardener, i.e. a curing agent, and the resin are kept separate, but breaking of the highly fragile glass envelope allows the two components to be mixed together and react.

It is also known to eliminate the inner envelope and imbed the hardener as a bar or solid granules in the mass of resin.

The obvious difficulty with such a cartridge is that during transport or at any time prior to use it is relatively easy to break the outer glass envelope, whereupon the cartridge becomes useless. Furthermore, the glass splinters present a considerable potential for injury to the persons handling the cartridge, and the resin can present further chemical burn hazards.

It has been suggested in recent times to inject the cartridge into the borehole by use of an elongated tube which is inserted into the borehole and pressurized in back of a cartridge so as effectively to "shoot" the cartridge into the end of the borehole. Since the typical glass cartridge is between 50 mm and 1000 mm long and has a wall thickness of between 0.3 mm and 0.8 mm, it is impossible to use this glass cartridge in an arrangement of this type wherein the insertion tube must inevitably bend somewhat.

It has further been suggested to provide an adhesive cartridge of the above-described general type wherein the outer envelope is formed of a synthetic-resin foil. This outer envelope is formed as a tube of a polymer. The hardener is either provided in a separate synthetic-resin tube inside the outer tube, or the outer tube is simply partitioned into two compartments, one of which contains the hardener and the other the resin. In both cases the two components are separated by a polymer partition wall. The main disadvantage of such an arrangement is that it is relatively limp so that slipping it into the borehole is a difficult operation. Thus, it is standard practice to provide a stiffening tube around such a cartridge in order to allow it to be slid into the bore with ease. Such an arrangement, however, has the considerable disadvantage that quite a bit of synthetic-resin foil is left in the borehole so that the adhesive cannot form a good bond with the wall of the borehole, as typically the adhesive remains mostly inside the stiffening tube even after breaking of the two envelopes. This disadvantage can be at least partially overcome by providing one of the components in a glass tube inside the synthetic-resin envelope of the other component. Thus the broken tube forms glass splinters that will shred and pierce the envelope and stiffening tube so as to form a good bond between the adhesive and the walls of the borehole. Such use of a glass envelope, however, has all the disadvantages of the glass-type cartridges.

It has also been suggested to form the outer envelope out of a polyamide foil. The hardener is once again provided in a glass capsule or envelope inside the polyamide outer sleeve. Once again this cartridge has the disadvantage that if the central glass envelope is broken during transport or handling the outer envelope will be pierced. Thus the contents can leak out so that the above-mentioned disadvantages of injury, chemical burn, and the like are all present.

All of the synthetic-resin cartridges using synthetic-resin tubes of foil have in addition the disadvantage that when used with an unsaturated polyester resin as the hardener it is possible for styrene to diffuse through the foil outwardly. This causes the cartridge to lose its stiffness and to expose the persons handling the unused cartridge to styrene fumes. Storage of large quantities of such cartridges creates a potentially explosive mixture of styrene and air.

Both the synthetic-resin cartridges and the glass cartridges are usually transparent to ultra-violet light. This greatly decreases the shelf life of the cartridges, since the ultraviolet radiation triggers polymerization in an unsaturated polyester resin. Thus, when the time comes to use the adhesive cartridge there is very little reactable resin left, so that a poor bond is formed between the rock anchor or the like and the borehole.

SUMMARY OF THE INVENTION

It is an object of the invention to improve on the prior art.

A more particular object of the present invention is to provide an improved adhesive cartridge.

Another object is the provision of an improved adhesive cartridge containing two masses corresponding to the components of a two-component adhesive, and usable to secure the end of a rock bolt, borehole anchor, extensometer, or the like in a mine borehole or the like.

Yet another object is to provide a catridge which has a long shelf life, is easy to handle and not likely to break prior to use, and which yet forms a good bond with the inside of a borehole.

Another object is to provide such a cartridge which is relatively stiff so that it can be injected pneumatically into the hole.

Still further objects are method of making and using the cartridge.

These objects are attained, in accordance with one aspect of the invention, in an adhesive cartridge of the above-described general type wherein the sleeve-like envelope is formed of an extruded material that is so formed by the mixture of an elastomeric and/or a polymeric synthetic resin with a filler that the finished adhesive cartridge is bendable, impact resistant, and nontransparent to light.

In such a cartridge it is possible to achieve sufficient flexibility so that the cartridge, when between 200 mm and 1500 mm long, can be automatically inserted into a borehole pneumatically and by means of known equipment. A further advantage of this cartridge is that the wall material is completely impervious to styrene and nontransparent to ultraviolet light so that the shelf life of the cartridge is almost unlimited.

In accordance with this invention the one mass of the one component of the two-component which is held in the resin envelope is separated by a partition from the mass of the other component of the adhesive. This partition may be constituted as a second or inner envelope provided inside the first or outer envelope. It is possible in accordance with this invention to form such a cartridge of one piece by extrusion. Thus the inner hardener tube or envelope is formed of the same exact synthetic-resin material as the outer resin tube or envelope. The hardener envelope is fixed to the inner wall or floor of the outer envelope. Thus when the cartridge is used a uniform mixing of the resin with the hardener is obtained.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

BRIEF DESCRIPTION OF THE DRAWING

FIG. 1 is an axial section through a cartridge in accordance with this invention;

FIG. 2 is an axial section through a borehole, illustrating use of the cartridge in accordance with this invention;

FIG. 3 is an axial section through another cartridge according to the present invention;

FIG. 3A is a section taken on line IIIA-IIIX of FIG. 3;

FIG. 4 is an axial section taken through yet another cartridge according to this invention;

FIG. 4A is a section taken on line IVA-IVA of FIG. 4;

FIG. 5 is an axial section taken through a further cartridge according to this invention; and FIG. 5A is a section taken on line VA-VA of FIG. 5.

DESCRIPTION OF PREFERRED EMBODIMENTS

FIG. 1 shows a cartridge 1 formed of a resin sleeve or envelope 2 of one of the materials described below and having a wall thickness of 0.3 mm, a length of 500 mm, and a diameter of 28 mm. It contains a mixture 10 of seven parts stone meal to three parts of unsaturated polyester resin. Inside this envelope 2 there is provided a glass tube 3 containing the hardener 9 formed as a mixture of gypsum and benzoyl peroxide. The tube 3 has an overall diameter of 5 mm and a length of 400 mm. The cartridge 1 is sealed at both ends with plugs 4 of putty.

This cartridge 1 is adapted to be mounted in a borehole 5 having a diameter of 32 mm. An anchor or extensometer 6 as described in the above-cited patent application, whose entire disclosure is herewith incorporated by reference, is inserted in the hole to break the sleeves 2 and 3 and mix together the components 9 and 10 into a mass 7. The material of the resin sleeve 2 was broken up into little pieces mixed in the homogeneous synthetic-resin mass 7. In a typical such arrangement as made according to the Examples given below it was possible to apply 27.5 tons of force parallel to the rod 6 away from the mass 7 before the rod ripped loose from the borehole 5. The mass 7 remained bonded in the hole 5.

FIGS. 3 and 3A show another arrangement of the above-described general type wherein the inner tube 3a is made of the same synthetic-resin material as the outer tube 2a and is unitarily formed therewith. The base plug 4 joins the elements 2a and 3a and the latter element 3a lies on the axis of the cylindrical tube 2a.

In FIGS. 4 and 4A the same general arrangement as shown in FIGS. 3 and 3A is employed, but here the tube 3b for the hardener is eccentric to the central axis of the tube 2b lying against one of the side walls thereof. Both of the arrangements of FIGS. 3 and 3A and 4 and 4A can be made by extrusion at between 160° C. and 270° C. in a single operation, the masses 9 and 10 thereafter being injected into the respective envelopes.

In FIGS. 5 and 5A the outer tube 2c is subdivided by an axially extending planar partition 8 into two compartments for the hardener and resin, respectively. This partition 8 is extruded unitarily with the tube 2c and extends therein along a chordal plane.

It is also within the scope of this invention to use a two-component adhesive of polyol-isocyanate or formaldehyde-toluenesulfonic acid. The one component will be held as a pressed block or granules, that is in solid form, inside the mass of the other component, or it can be in past form.

Below are given a plurality of Examples of different synthetic-resin mixtures usable for the envelopes of the arrangements shown in FIGS. 1, 3, 3A, 4, 4A, 5 and 5A. These examples refer to the synthetic-resin material constituting the envelopes. All of the percentages refer to percentage by weight.

EXAMPLE I

70% lignite;
25% polymeric synthetic resin, e.g., polyethylene, polypropylene, or copolymers of ethylene or propylene; and
5% lubricant, e.g., wax or oil.

EXAMPLE II

70% pulverized coke;
25% a polymeric synthetic resin, e.g., polyethylene; and
5% elastomeric synthetic resin, e.g., rubber in power or latex form.

EXAMPLE III

60% brown coal;
30% polymeric synthetic resin, e.g., polypropylene; and

10% elastomeric synthetic resin, e.g., mixed polymers of butadiene and styrene or acrylonitrile or polyisobutylene.

EXAMPLE IV

80% lignite;
18% elastomeric synthetic resin, e.g., polyethylene; and
2% plasticizer oil.

EXAMPLE V

75% stone meal;
20% polymeric synthetic resin, e.g., polyethylene; and
5% plasticizer oil, e.g., castor oil.

EXAMPLE VI

70% chalk;
20% polymeric synthetic resin, e.g., polypropylene; and
10% wax.

EXAMPLE VII

35% coal;
35% stone meal or chalk;
20% polymeric synthetic resin, e.g., polyethylene;
5% elastomeric synthetic resin; and
5% plasticizer oil, e.g., mineral oil.

In order to form sufficiently brittle tubes with an extruder the solids content by weight was kept between 50% and 80% and the wall thickness of the outer envelope was maintained between 0.5 mm and 2.0 mm, preferably between 0.8 mm and 1.2 mm.

The bendability of such a tube having a diameter of 24 mm and a wall thickness of 1.1 mm was tested by positioning the tube on two knife-edge supports spaced apart by 300 mm and applying a force of 5 kg downwardly on the thus-positioned tube. A deflection of between 10 mm and 15 mm was obtained, indicating that the tube had sufficient flexibility for use. The weight was increased to between 8 kg and 10 kg before the tube broke, indicating that the tube was still sufficiently brittle to be usable in the desired manner.

With the cartridge and the methods of making and using the same as described above it is therefore not necessary to take particular steps to avoid the breaking of the cartridge. However, once in use it is possible to rupture the cartridge effectively and form a uniform and homogeneous mixture of synthetic-resin material in the borehole that effectively secures the extensometer, anchor or the like in place therein.

It will be understood that each of the elements described above, or two or more together, may also find a useful application in other types of applications differing from the types described above.

While the invention has been illustrated and described as embodied in an adhesive rock anchorage, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitutes essential characteristics of the generic or specific aspects of this invention.

What is claimed as new and desired to be protected by Letters Patent is set forth in the appended claims.

1. An adhesive cartridge for securing an object in a hole, comprising an elongated substantially rigid tubular envelope adapted for insertion into a hole and being of a material composed of thermoplastic synthetic resin and 50–80% by weight of a particulate filter therefor, said material being sufficiently brittle to facilitate shattering of the envelope in the hole but having sufficient elasticity to permit limited flexing of the envelope so as to facilitate accommodation of the envelope to a nonlinear path of insertion into the hole; a mass of one component of a two-component adhesive in said envelope; and a mass of the other component of said two-component adhesive also in said envelope and juxtaposed with the first-mentioned mass to become mixed therewith on destruction of the envelope in the hole, said material also being opaque to prevent the access of light to said two-component adhesive so as to avoid polymerization and consequent spoilage of the same and thus to afford extended shelf-life to the cartridge.

2. A cartridge as defined in claim 1, further comprising a partition separating said masses, said first mass being a hardenable resin and the second-mentioned mass being a hardener capable of reacting with said hardenable resin.

3. A cartridge as defined in claim 2, wherein said synthetic resin is an elastomer.

4. A cartridge as defined in claim 1, wherein said synthetic resin is a polymer.

5. A cartridge as defined in claim 2, wherein said envelope and said partition are unitary.

6. A cartridge as defined in claim 2, wherein said filler is composed of organic and combustible carbon particles.

7. A cartridge as defined in claim 1, wherein said filler is stone meal.

8. A cartridge as defined in claim 2, wherein said synthetic resin is polyethylene or polypropylene.

9. A cartridge as defined in claim 2, wherein said synthetic resin includes rubber.

10. A cartridge as defined in claim 2, wherein said synthetic resin is a mixed polymer of butadiene and styrene.

11. A cartridge as defined in claim 2, wherein said synthetic resin is a mixed polymer of butadiene and acrylonitrile.

12. A cartridge as defined in claim 2, wherein said synthetic resin is a mixed polymer of polyisobutylene.

13. A cartridge as defined in claim 2, wherein said synthetic resin is admixed with a lubricant.

14. A cartridge as defined in claim 2, wherein said synthetic resin is admixed with a plasticizer oil.

15. A method of anchoring an object in a hole, comprising the steps of providing an adhesive cartridge having the components of a two-component adhesive contained in a tubular envelope which is of a material combining synthetic resin and 50–80% by weight of solid filler so as to be substantially rigid and sufficiently brittle to be readily frangible in the hole but sufficiently elastic to be able to undergo at least some flexing transversely of the elongation of the envelope; and pneumatically inserting the cartridge through a tube into the hole whereby, when the tube is somewhat curved in its longitudinal direction due to surrounding conditions, said envelope can elastically yield to a limited extent and accommodate itself to the curvature of the tube without breaking as a result of such yielding.

* * * * *